United States Patent
Komagata et al.

[11] Patent Number: 5,871,134
[45] Date of Patent: Feb. 16, 1999

[54] METHOD AND APPARATUS FOR BREAKING AND CUTTING A GLASS RIBBON

[75] Inventors: Kazuyuki Komagata; Toru Iseda, both of Yokohama, Japan

[73] Assignee: Asahi Glass Company Ltd., Tokyo, Japan

[21] Appl. No.: 946,792

[22] Filed: Oct. 8, 1997

Related U.S. Application Data

[63] Continuation of Ser. No. 579,421, Dec. 27, 1995, abandoned.

[30] Foreign Application Priority Data

Dec. 27, 1994 [JP] Japan ................................. 6-325859

[51] Int. Cl.$^6$ ....................................................... B23F 3/00
[52] U.S. Cl. ........................... 225/2; 225/93.5; 225/96.5; 83/879
[58] Field of Search ............................. 225/2, 93.5, 94, 225/96.5, 97, 104; 219/121.67, 121.72, 121.76; 83/879, 880

[56] References Cited

U.S. PATENT DOCUMENTS

| | | | |
|---|---|---|---|
| 3,453,097 | 7/1969 | Hafner | 219/121.67 X |
| 3,543,979 | 12/1970 | Grove | 225/2 |
| 3,592,370 | 7/1971 | Boardman | 225/2 |
| 3,610,871 | 10/1971 | Lumley | 219/121.76 |
| 3,629,545 | 12/1971 | Graham et al. | 219/121.72 |
| 3,754,884 | 8/1973 | McDavid et al. | 225/96.5 X |
| 3,935,419 | 1/1976 | Lambert et al. | 225/93.5 X |
| 4,467,168 | 8/1984 | Morgan et al. | 219/121.67 |
| 4,471,895 | 9/1984 | Lisec, Jr. | 225/96.5 X |
| 5,093,549 | 3/1992 | Iwai et al. | 219/121.67 |
| 5,138,131 | 8/1992 | Nishikawa et al. | 219/121.67 |

FOREIGN PATENT DOCUMENTS 3 13040  2/1991  Japan.

OTHER PUBLICATIONS

Proceedings of the IEEE, vol. 57, No. 2, pp. 114–115, 132–135 and 146, Feb. 1969, Francis P. Gagliano, et al., "Lasers In Industry".

*Primary Examiner*—M. Rachuba
*Attorney, Agent, or Firm*—Oblon, Spivak, McClelland, Maier & Neustadt, P.C.

[57] ABSTRACT

For breaking and cutting a glass to obtain a glass plate having a rectangular shape, a first preliminary break is formed in a portion of a glass ribbon near a side edge of the glass ribbon along a first planned breaking and cutting line perpendicular to a transferring direction of the glass ribbon. Local heating is movably applied to a portion of the first preliminary break near an end of the first preliminary break to progress a first actual breaking and cutting line therefrom. A first bending moment is applied along the first planned breaking and cutting line to break and cut the glass ribbon in a direction substantially perpendicular to the transferring direction so as to obtain a glass plate. Second preliminary breaks are formed in an end of the glass plate along second planned breaking and cutting lines substantially parallel with the transferring direction. Local heating is movably applied to portions of the second preliminary breaks near each end thereof to progress second actual breaking and cutting lines, using as starting points the ends of the second preliminary breaks. Second bending moments are applied along the second planned breaking and cutting lines to break and cut the glass plate in a direction substantially parallel with the transferring direction.

9 Claims, 2 Drawing Sheets

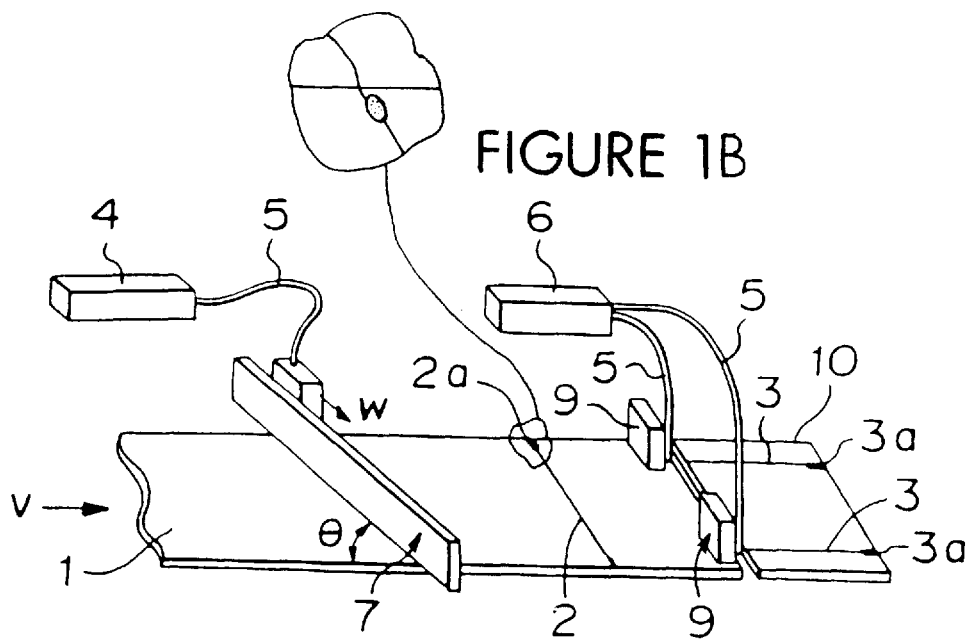
FIGURE 1B
FIGURE 1A
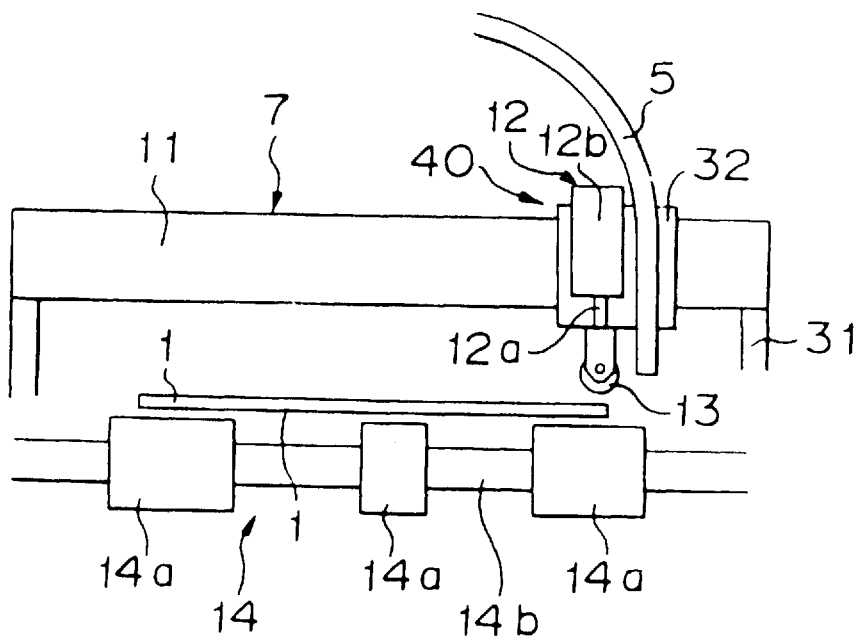
FIGURE 2

METHOD AND APPARATUS FOR BREAKING AND CUTTING A GLASS RIBBON

This application is a Continuation of application Ser. No. 08/579,421, filed on Dec. 27, 1995, now abandoned.

BACKGROUND OF THE INVENTION

1. Field of the Invention

The present invention relates to a method for breaking and cutting a glass ribbon and an apparatus therefor, in particular a method for breaking and cutting a glass ribbon and an apparatus therefor wherein fine glass fragments are not generated.

2. Discussion of the Background

In order to cut a glass plate, there has been used a method wherein a cutting wheel made from, e.g., cemented carbide, is pressed against a glass plate under a constant load to form a scratched line in the glass plate, and then the glass plate is bent along the scratched line to apply a bending moment to the glass plate so as to break and cut the glass plate.

In order to prevent the actual breaking and cutting line from deviating from a planned breaking and cutting line or to fail to break a glass plate as planned, it is necessary to apply a sufficiently great load when the cutting line is formed. As a result, a median crack which is essentially required for cutting and which progresses in the thickness direction of the glass plate, and lateral cracks which progress in substantially parallel to a surface of the glass plate are created in a crustal portion of the glass plate by the cutting line. Since these cracks exfoliate from the cutting line, or after breaking and cutting the glass plate, occurrence of fine glass fragments is unavoidable.

That fine glass fragments adhere to, e.g., a supporting table for the glass plate to form fine scratches on the glass surface. Fine glass fragments which have adhered to the glass surface sometimes scratch the glass surface in washing. Fine glass fragments which are not removed by washing sometimes scratch the surface of the glass plate when it is polished or when the glass plate is put on another glass plate.

As a breaking and cutting method wherein fine glass fragments are not liable to be generated, there has been known a method to cause thermal stress by a $CO_2$ laser to break and cut a glass plate (F. P. Gagliano & R. M. Lumley, Proc. of the IEEE, vol. 57, no. 2, 1969). It has also been known to apply this method to break and cut a glass plate in a desired shape (JP-B-313040).

These known methods have a problem in that breaking and cutting stop a minute length from the edge of the glass plate, and do not reach an opposite end of the glass plate. If such a glass plate is broken or cut again, required dimensional accuracy can not obtained.

In FIG. 4, there is shown a perspective view of an actual breaking and cutting line which does not reach the opposite end. The starting point of the actual breaking and cutting line 22 is a preliminary break 21 which has been formed on an end of a glass plate 10. Reference numeral 23 designates a portion where the breaking and cutting line has not been formed.

In these methods, the preliminary break which acts as a starting point of breaking and cutting has to be formed in a portion adjacent to an end of a glass plate when the glass plate is broken and cut. Forming the preliminary break is likely to produce fine glass fragments.

There has not been known a method wherein a glass ribbon which has been formed according to, e.g., a floating process, is cut by thermal stress in an on-line situation.

SUMMARY OF THE INVENTION

It is an object of the present invention to resolve the disadvantages of the conventional methods and to provide a method and an apparatus which are suitable to break and cut a moving glass ribbon formed by, e.g., a floating process or a down draw process.

The foregoing and other objects of the present invention have been attained by providing a method for breaking and cutting a glass ribbon to obtain a glass plate having a rectangular shape, comprising the steps of forming a first preliminary break in a portion of a glass ribbon near a side edge thereof along a first planned breaking and cutting line substantially perpendicular to a transferring direction of the glass ribbon; applying local heating to a portion of the first preliminary break near an end thereof; moving the heating point on the first planned breaking and cutting line to form a first actual breaking and cutting line on the first planned breaking and cutting line, using the end of the first preliminary break as a starting point; applying a first bending moment along the first planned breaking and cutting line to break and cut the glass ribbon in a direction substantially perpendicular to the transferring direction so as to obtain a glass plate; forming second preliminary breaks in an end of the glass plate along second planned breaking and cutting lines substantially parallel to the transferring direction; applying local heating to portions of the second preliminary breaks near each end thereof; moving the heating points along the second planned breaking and cutting lines to form second actual breaking and cutting lines on the second planned breaking and cutting lines, using the ends of the second preliminary breaks as starting points, and applying second bending moments along the second planned breaking and cutting lines to break and cut the glass plate in a direction substantially parallel to the transferring direction. This may be done while the second actual breaking and cutting lines are progressing or just after the second actual breaking and cutting lines have stopped progressing.

The present invention also provides an apparatus for breaking and cutting a glass ribbon, comprising a perpendicular breaking and cutting device which breaks and cuts a glass ribbon along a first planned breaking and cutting line substantially perpendicular to a transferring direction of the glass ribbon to obtain a glass plate; and parallel breaking and cutting devices arranged downstream of the perpendicular breaking and cutting device in the transferring direction, and which break and cut the glass plate along second planned breaking and cutting lines substantially parallel to the transferring direction. The perpendicular breaking and cutting device includes a first cutting tool which forms a first preliminary break in a portion of the glass ribbon near a side edge thereof along the first planned breaking and cutting line; first heating means for applying local heating to a portion of the first preliminary break near an end thereof; and first heating point moving means for relatively moving the heating point of the first heating means with reference to the glass plate along the first planned breaking and cutting line. The parallel breaking and cutting devices include second cutting tools which form second preliminary breaks on an end of the glass plate along the second planned breaking and cutting lines; second heating means for applying local heating to portions of the second preliminary breaks near each end thereof; second heating points moving means for relatively moving the heating points of the second heating means with reference to the glass plate along the second planned breaking and cutting lines; and bending moment applying means for applying bending moments to the glass plate along the second actual breaking and cutting lines.

The present invention can prevent a glass ribbon from being left uncut at end portions of the second actual breaking and cutting lines because the second bending moments are applied along the second actual breaking and cutting lines while the second actual breaking and cutting lines are being formed or just after the second actual breaking and cutting lines have stopped progressing.

Breaking and cutting in the direction perpendicular to the transferring direction of the glass ribbon precedes breaking and cutting in the direction in parallel with the transferring direction. As a result, even if a portion of a side edge of the glass ribbon which has been left uncut is roughly broken, no problem is created because that portion will be removed later.

Even if the preliminary break for the breaking and cutting in the direction perpendicular to the transferring direction of the glass ribbon formation is carried out by an ordinary method which is likely to generate fine glass fragments, no problem is created. The portion of the glass ribbon where the preliminary break is formed lies on an edge of the glass ribbon which will be removed. The length of the preliminary break is short. As a result, the amount of the fine glass fragments which adhere to the surface of the glass ribbon and to transferring rollers is small.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 is a perspective view of an embodiment of the present invention;

FIG. 2 is a front view of a perpendicular breaking and cutting device according to the embodiment of FIG. 1;

DESCRIPTION OF THE PREFERRED EMBODIMENT

Figure 3:
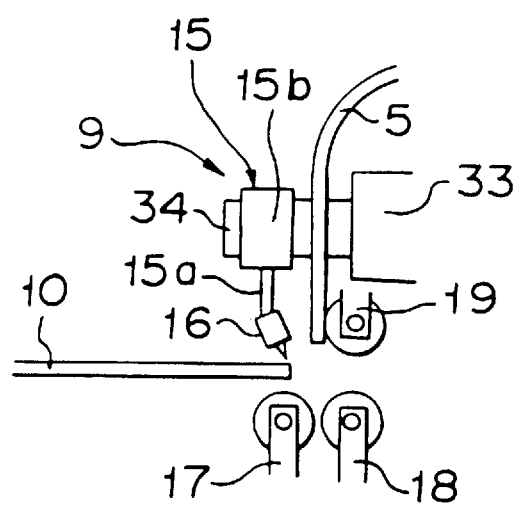
FIG. 3 is a side view of a parallel breaking and cutting device according to the embodiment if FIG. 1.
Figure 4:
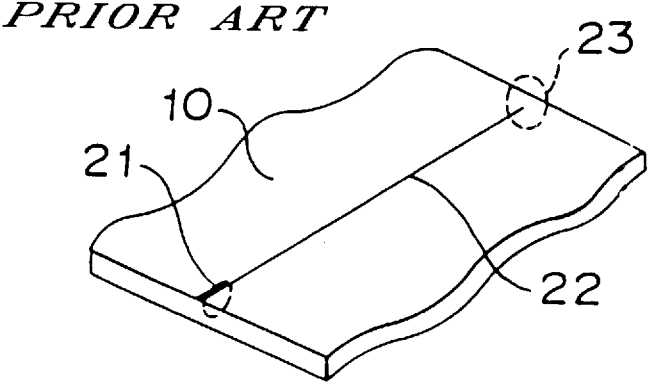
FIG. 4 is a perspective view showing a conventional actual breaking and cutting line.

Now, the present invention will be described in detail in reference to a preferred embodiment illustrated in the accompanying drawings.

In FIG. 1, there is shown a perspective view of the basic structure of the apparatus according to the present invention. A glass ribbon 1 is transferred at a speed V in a direction indicated by an arrow. A perpendicular breaking and cutting device 7 which breaks and cuts the glass ribbon 1 includes heating means 4 and heat transferring means 5. Parallel breaking and cutting devices 9 which break and cut the glass ribbon include common heating means 6 and heat transferring means 5, and are arranged downstream of the perpendicular breaking and cutting device 7. Reference numeral 2 designates a first actual breaking and cutting line which is formed by the perpendicular breaking and cutting device 7. Reference numeral 3 designates second actual breaking and cutting lines which are formed by the parallel breaking and cutting devices 9. Reference numerals 2a and 3a designate first and second preliminary breaks, respectively, which are formed on first and second planned breaking and cutting lines at a side edge and an end of a glass plate.

The heating means 4 and 6 can use laser light, heated air, a combustion flame and the like, or a combination thereof.

In order to obtain high breaking and cutting accuracy, use of laser light from, e.g., an excimer laser, a YAG laser, a $CO_2$ laser and a CO laser, or a combustion flame is preferable. In particular, use of a $CO_2$ laser or a combustion flame is preferable in terms of energy absorption efficiency and economy.

In the present invention, it is necessary to apply local heating to a portion in the vicinity of an end of each actual breaking and cutting line 2, 3 and to move the heating point along the actual breaking and cutting line to prevent each actual breaking and cutting line from deviating off its planned course. In order to apply the local heating, it is preferable to use the heat transferring means to direct a heating source to a desired location.

Specific examples of the heat transferring means 5 are as follows: In the case of using laser light, an optical system which comprises a crystal fiber optical guide, a fine optical guide tube, a lens and a mirror can be used as the heat transferring means 5. In the case of using heated air as the heating means, a heat-resistant tube and the like can be used. In the case of using a combustion flame, a combustion nozzle, a rubber tube and the like can be used as the heat transferring means. In the embodiment, $CO_2$ lasers are used as the heating means 4 and 6, and fine optical guide tubes for $CO_2$ lasers are used as the heat transferring means 5.

In FIG. 2, there is shown a front view of the perpendicular breaking and cutting device 7 viewed from the transferring direction of the glass ribbon. Reference numeral 12 designates cutting tool supporting and pressing means which supports a cutting tool 13 and which presses the cutting tool 13 against the glass ribbon as required. The cutting tool supporting and pressing means 12 is constituted by a rod 12a and an air cylinder 12b. The cutting tool 13 is attached to the leading end of the rod 12a, and is moved vertically by the air cylinder 12b. The cutting tool supporting and pressing means lowers the cutting tool 13 to press the cutting tool 13 against the glass ribbon 1 when the first preliminary break is formed. When the first preliminary break has been formed, the cutting tool supporting and pressing means 12 raises the cutting tool 13.

In order to improve the breakage at the opposite side edge of the glass ribbon, the cutting tool 13 may be lowered again at a position close to the opposite side edge to form a break. The vertical movement mechanism shown is a non-limiting example.

Bending moment applying means is arranged at the lower surface side of the glass ribbon downstream of the perpendicular breaking and cutting device 7. An example of the bending moment applying means is the provision of a height difference between adjoining sets of rollers.

Reference numeral 40 designates moving means for moving the cutting tool and the heat transferring means in the horizontal direction. The moving means 40 is constituted by a guide rail 11 and a slider 32 sliding along the guide rail. The cutting tool supporting and pressing means 12 and the heat transferring means 5 are fixed on the slider 32. When the slider 32 is moved along the guide rail 11 by a mechanism such as a rack and pinion, the cutting tool 13 and a locally heated point are moved accordingly.

As the cutting tool 13, a cemented carbide wheel, a diamond blade and the like can be used, as in the formation of a preliminary break in the usual breaking and cutting of a glass plate.

Reference numeral 14 designates a transfer roller mechanism which transfers the glass ribbon 1. Rollers 14a rotate around a roller shaft 14b to transfer the glass ribbon 1 and the glass plate 10 cut therefrom. In FIG. 3, there is shown a side view of one of the parallel breaking and cutting devices 9. Reference numeral 16 designates a cutting tool. Reference numeral 15 designates cutting tool pressing means which supports the cutting tool 16 and which presses the cutting tool 16 against the glass plate as required. The cutting tool pressing means 15 is constituted by a rod 15a and an air cylinder 15b. The cutting tool 16 is attached to the leading end of the rod 15a, and is vertically moved by the air cylinder 15b. The cutting tool pressing means 15 lowers the cutting tool 16 when the second preliminary breaks are to be formed. The cutting tool pressing means 15 raises the cutting tool 16 when the second preliminary breaks have been formed. The vertical movement mechanism shown is a non-limiting example.

Reference numeral 34 designates a supporting plate to which the cutting tool pressing means 15 and the heat transferring means 5 are fixed. The supporting plate 34 is fixed to a base 33. In the embodiment, the horizontal positional relationship between the cutting tool 16 and the heat transferring means 5 is fixed. The glass plate 10 which has been cut out from the glass ribbon 1 moves on the transfer rollers 14 horizontally, creating relative movement of the cutting tools 16 and the heat transferring means 5 with reference to the glass plate 10 in the transferring direction of the glass ribbon. In accordance with the present invention, the transfer rollers 14 not only comprise transfer means for they glass ribbon but also heating point moving means for moving the heated points with reference to the glass plate 10.

Reference numerals 17, 18 and 19 designate rollers (bending moment applying means) for applying a bending moment to the glass plate 1. The rollers 17 and 18 are activated by driving means (not shown) in such a manner that the rollers push up on the lower surface of the glass plate 10 just below an actual breaking and cutting line to be formed. The roller 19 is activated by driving means (not shown) in such a manner that the roller pushes down the glass plate 10, from upward to downward in FIG. 3, beside the actual breaking and cutting line to be formed. Thus, the localized bending moment is applied to the glass plate 10 so that the surface with a second preliminary break formed thereon becomes convex.

Although the cutting tool 16 of the parallel breaking and cutting device 9 can use a cemented carbide wheel and the like, it is preferable that the cutting tool uses a cutter made from, e.g., monocrystal diamond or sintered diamond with a leading edge sharpened to reduce formation of lateral cracks.

Now, the operation of the apparatus according to embodiment will be explained. The glass ribbon 1 is transferred by the transferring rollers 14 at the constant speed v.

Formation of the first preliminary break at the upstream perpendicular breaking and cutting device 7 is carried out as follows: The slider 32 is moved along the guide rail 11 to move the cutting tool 13 for forming the preliminary break. The cutting tool 13 moves at a constant speed, W=v/cosθ, along a linear line which extends at angle θ with respect to the transferring direction of the glass ribbon moving at the constant speed v. As a result, the cutting tool 13 moves on a planned breaking and cutting line which is substantially perpendicular to the transferring direction. At the same time, a wheel of the cutting tool 13 is pressed against the glass ribbon 1 by the cutting tool supporting and pressing means 12 to form the first preliminary break (as at 2a in FIG. 1) in the vicinity of a side edge of the glass ribbon 1 on the first planned breaking and cutting line (as at 2). The first preliminary break works as a starting point of the actual breaking and cutting line.

It is preferable that the first preliminary break is formed at a portion slightly spaced from the side edge of the glass ribbon 1, as shown in the blown up circle in FIG. 1, not at the side edge of the glass ribbon 1. The formation of the first preliminary break at such a position can prevent two broken and cut sections from colliding to produce glass fragments because the two sections remain joined and fastened together at both sides of the first actual breaking and cutting line when the first actual breaking cutting line is progressing.

Next, a portion of the breaking and cutting line in the vicinity of the leading edge is locally heated, and the heating point created by the heating means 4 is moved along the first planned breaking and cutting line by moving the slider 32 along the guide rail 11. In that manner, stress concentration is created at the first planned breaking and cutting line by the heat, so that the first actual breaking and cutting line will follow the path of the first planned breaking and cutting line.

In this case, the formation of the preliminary break sometimes causes some cracks, and an uncut portion which is inherent in thermal stress cutting, is sometimes caused. This uncut portion as well as the uncut portion at the cutting starting portion may be roughly broken by applying a bending moment. This is because these uncut portions will be cut off by the following parallel breaking and cutting devices 9. However, it is preferable that tensile stress is applied to the glass ribbon when applying a bending moment to prevent the two broken sections from colliding to produce glass fragments. In this manner, the glass plate 10 is separated from the glass ribbon 1.

Next breaking and cutting is carried out at the downstream parallel breaking and cutting devices 9. First, the glass plate 10 is pushed up by the rollers 17 and 18. While a bending moment is applied to the glass plate 10 by such an operation, blades of the cutting tools 16 are pressed against the glass plate 10 by the cutting tool pressing means 15 to form the preliminary breaks as the starting points of the actual breaking and cutting lines on the planned breaking and cutting lines at an end of the glass plate 10. Since the cutting tools 16 are fixed to the bases 33 through the supporting plates 34, the preliminary breaks are formed in parallel with the transferring direction of the glass plate 10. In consideration of the transferring direction of the glass ribbon, it is preferable that the preliminary breaks are formed at a downstream end of the glass plate 10 in the transferring direction or at a portion in the vicinity of the downstream end.

Application of the bending moments may be carried out just after formation of the preliminary breaks. However, it is more preferable that the application of the bending moments is carried out at the same time as the formation of the preliminary breaks in order to shorten a time required to break and cut the glass plate.

Although in the embodiment the bending moments can be applied to form sufficiently deep preliminary breaks under a low load, other methods can be adopted. For example, the preliminary breaks can be formed under a low load by forming the preliminary breaks on a surface of the glass plate which is opposite to a surface of the glass plate to be heated when the actual breaking and cutting lines are formed after formation of the preliminary breaks.

In accordance with the present invention, when the preliminary breaks are formed in parallel with the transferring direction, formation of the preliminary breaks by the cutting tools 16 can be carried out under a load as low as 20–200 gf.

Formation of the preliminary breaks under such a light load is preferable in terms of avoiding the creation of fine glass fragments.

Next, the actual breaking and the cutting lines have portions in their vicinity of the leading edges locally heated by the heating means 6. In this manner, stress concentration is caused on the planned breaking and cutting lines by the heat and the actual breaking and cutting lines follow the planned breaking and cutting lines. At this time, the transfer of the glass plate 10 allows the heating points and the glass plate 10 to relatively move without moving the heated points themselves. The bending moments are applied to the glass plate 10 no later than a time from just before and just after the actual breaking and cutting stops, thereby breaking and cutting the glass plate 10 in a direction parallel with the transferring direction without uncut portions being left.

Although it is preferable that the timing when the bending moments are applied is at latest just before completion of the actual breaking and cutting, the timing may be just after the actual breaking and cutting lines have stopped progressing. This prevents the actual breaking and cutting lines at the uncut portions from being curved because the inertia of the progress of the actual breaking and cutting lines can be utilized. When the preliminary breaks are formed at the downstream edge of the glass plate in the transferring direction, it is preferable that the bending moments are applied also when the leading edges of the actual breaking and the cutting lines have approached the upstream end of the glass plate in the transferring direction.

The method for causing the bending moments on the glass plate 10 is not limited to the method of the embodiment, and a variety of known methods can be adopted.

The breaking and cutting was carried out specifically as follows:

The breaking and cutting apparatus shown FIGS. 1 through 3 was arranged at a position which is near to a terminal end of the production line of floating glass plates and where a glass ribbon has cooled almost to room temperature.

The glass ribbon 1 was made of soda-lime glass and was 0.7 mm in thickness and 3 m in width. The transferring speed of the glass ribbon was 50 mm/sec. The heating means transferring device at the perpendicular breaking and cutting device 7 was arranged to slant at 60° to the transferring direction of the glass ribbon. While the heating means transferring device was moving at a speed of 100 mm/sec., the cutting tool 13 (cemented carbide wheel) cut a cutting line having a length of 100 mm under a load of 1.5 kg at a position of the glass ribbon which was inwardly spaced from a side edge of the glass ribbon by 10 mm.

The cutting tool 13 was raised, and $CO_2$ laser beam light was passed from the leading end of cutting line at a speed of 100 mm/sec to extend a break at the cutting line. The laser beam light was blocked off at a position which was spaced from the opposite side edge of the glass ribbon by 110 mm, and the cutting tool 13 was lowered again to form a cutting line having a length of 100 mm. The strength of the $CO_2$ laser was 100 W on the glass surface. Portions having a length of 10 mm were left uncut at both side edges of the glass ribbon, and the uncut portions were broken by a difference in height between the transferring rollers 14.

Next, when a glass plate 10 thus broken and cut was passed through the parallel breaking and cutting devices at a speed 50 mm/sec., the cutting tools 16 (diamond cutters) were lowered to form cutting lines on the upper surface of the glass plate under a load of 40 g. The cutting lines were formed to have a length of 5 mm at positions which were inwardly spaced from the downstream end of the glass plate in the transferring direction by about 1 mm. Just after the cutting lines were formed, portions of the lower surface of the glass plate opposite to the cutting lines, and positions at both sides of each cutting line which were spaced from each cutting line on the upper surface of the glass plate by 50 mm, were pinched by the rollers 17, 18 and 19. This pinch flexed the glass plate to deepen the cutting lines. Continuous transfer of the glass plate allowed the $CO_2$ laser beam with a strength of 50 W to cause breaking and cutting starting at the cutting lines. The rollers 17, 18 and 19 pinched the glass plate again at positions of 20 mm short of the terminal end of the glass plate to break the glass plate.

A total of four parallel breaking and cutting devices 9 were arranged so that two were at positions 300 mm inside side edges of the glass plate and the remaining two were at positions 800 mm further inward from the first two at both side edges in the width direction of the glass plate. Perpendicular breaking and cutting lines were formed at 1,000 mm intervals. As a result, glass substrates dimensioned as 800× 1,000 mm were obtained. Observation of these substrates under a light source of 200,000 lux in a dark room showed that no fine glass fragments were adhered, and that dimensional accuracy in cutting was within ±0.1 mm with respect to the entire circumference including the starting points and terminal points.

In accordance with the present invention, glass substrates with minimal adhered fine glass fragments can be obtained without carrying out special washing. As a result, the number of scratches which are caused in a polishing process for the glass substrate can decrease to shorten a time required for polishing. In addition, since adherence of fine glass fragments to the transferring rollers is extremely decreased, almost no scratches are caused on the lower surfaces of glass plates to improve yield of the products.

Washing glass plates is easy because grinding fluid and the like is not adhered to the glass plates.

Further, even glass plates which have a thickness of 0.2 mm or less, and which are difficult to form a cutting line on, can be cut with good yield without damaging the glass plates.

The present invention is extremely effective in particular to produce substrates for liquid crystal displays. Specifically, since almost no fine glass fragments are caused in breaking and cutting, foreign materials are not left on LCD substrates to cause electrical shorts and unevenness of color due to variations in thickness of a liquid crystal layer in the substrates.

In addition, the first preliminary break is formed at a position spaced from a side edge of the glass ribbon to prevent two broken and cut sections from colliding with each other and to reduce the danger of producing fine glass fragments. In this case, both side portions of the glass ribbon which are relatively thick are not required to be broken and cut by thermal stress, offering an advantage in that the heat capacity of the local heating means can be decreased.

Obviously, numerous modifications and variations of the present invention are possible in light of the above teachings. It is therefore to be understood that within the scope of the appended claims, the invention may be practiced otherwise than as specifically described herein.

What is claimed is:

1. A method for breaking and cutting a glass to obtain a glass plate having a rectangular shape, comprising the steps of:

forming a first preliminary break in a portion of a glass ribbon near a side edge of the glass ribbon along a first planned breaking and cutting line substantially perpendicular to a transferring direction of the glass ribbon;

applying local heating to a heating point, starting at a portion of the first preliminary break near an end of the first preliminary break farthest from said side edge;

moving the heating point from the first preliminary break along the first planned breaking and cutting line to progress a first actual breaking and cutting line;

applying a first bending moment along the first actual breaking and cutting line to break and cut the glass ribbon in a direction substantially perpendicular to the transferring direction, thereby obtaining a glass plate;

forming second preliminary breaks in an end of the glass plate along second planned breaking and cutting lines substantially in parallel with the transferring direction; and applying local heating to heating points at portions of the second preliminary breaks near ends of the second preliminary breaks;

moving the heating points from the second preliminary breaks along the second planned breaking and cutting lines to progress second actual breaking and cutting lines; and applying second bending moments along the second planned breaking and cutting lines to break and cut the glass plate in a direction substantially in parallel with the transferring direction.

2. A method according to claim 1, wherein in the step of forming the second preliminary breaks, bending moments are applied along the second planned breaking and cutting lines at substantially the same time as the step of forming the second preliminary breaks.

3. A method according to claim 1, wherein the second preliminary breaks are formed on a surface opposite to the surface to be heated in said step of forming second preliminary breaks.

4. A method according to claim 1, wherein the first preliminary break is formed at a portion spaced from the side edge of the glass ribbon.

5. A method according to claim 1, wherein the local heating step is carried out using one of a $CO_2$ laser and a combustion flame.

6. A method according to claim 1, wherein the second preliminary breaks are formed under a load of no more than 200 gf.

7. An apparatus for breaking and cutting a glass ribbon, comprising:

a perpendicular breaking and cutting device which breaks and cuts a glass ribbon along a first planned breaking and cutting line substantially perpendicular to a transferring direction of the glass ribbon to obtain a glass plate; and parallel breaking and cutting devices positioned downstream with reference to the perpendicular breaking and cutting device in the transferring direction, and which break and cut the glass plate along second planned breaking and cutting lines substantially in parallel with the transferring direction;

wherein the perpendicular breaking and cutting device includes a first cutting tool which forms a first preliminary break in a portion of the glass ribbon near a side edge of the glass ribbon along the first planned breaking and cutting line; first heating means for applying local heating to a heating point starting at a portion of the first preliminary break near an end of the first preliminary break farthest from said side edge; and first heating point moving means for relatively moving the heating point of the first heating means with reference to the glass ribbon along the first planned breaking and cutting line; and wherein the parallel breaking and cutting devices include second cutting tools which form second preliminary breaks on an end of the glass plate along the second planned breaking and cutting lines; second heating means for applying local heating to heating points at portions of the second preliminary breaks near each end of the second preliminary breaks; second heating point moving means for relatively moving the heating points of the second heating means with reference to the glass plate along the second planned breaking and cutting lines; and bending moment applying means for applying bending moments to the glass plate along the second actual breaking and cutting lines.

8. An apparatus according to claim 7 wherein the bending moment applying means comprise pressing rollers.

9. A method according to claim 1, wherein the step of applying the second bending moments is performed just before the second actual breaking and cutting lines reach the other edges.

* * * * *